Figure 1:
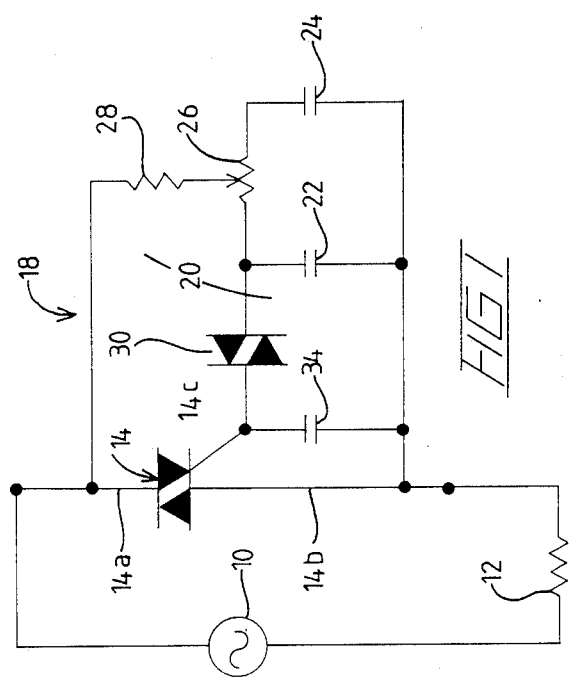

United States Patent [19]

Joseph

[11] Patent Number: 4,504,742
[45] Date of Patent: Mar. 12, 1985

[54] ELECTRICAL SWITCHING DEVICE

[75] Inventor: Beresford C. Joseph, Doncaster East, Australia

[73] Assignee: Middendorp Electric Co. Pty. Ltd., West Melbourne, Australia

[21] Appl. No.: 371,292

[22] PCT Filed: Aug. 4, 1981

[86] PCT No.: PCT/AU81/00103
§ 371 Date: Apr. 5, 1982
§ 102(e) Date: Apr. 5, 1982

[87] PCT Pub. No.: WO82/00549
PCT Pub. Date: Feb. 18, 1982

[30] Foreign Application Priority Data

Aug. 4, 1980 [AU] Australia ............... PE4860

[51] Int. Cl.$^3$ ............................................. H03K 17/72
[52] U.S. Cl. ............................... 307/252 N; 307/252 B
[58] Field of Search ........... 307/252 B, 252 H, 252 N, 307/252 Q, 305; 323/282, 289, 311; 361/13, 189, 190, 197, 199

[56] References Cited

U.S. PATENT DOCUMENTS 3,763,395 10/1973 Shilling et al. ............... 307/252 B
4,052,624 9/1977 Hamstra ........................ 307/252 B
4,220,910 9/1980 Chiba et al. .................. 307/252 N Primary Examiner—John Zazworsky
Attorney, Agent, or Firm—Murray, Whisenhunt and Ferguson

[57] ABSTRACT

Electrical switching device for controlling current flow from an alternating current source (10) and having a main thyristor (14,16) such as a triac or a silicon controlled rectifier connected in series with a load (12) across the source. The control terminal (14c,16c) of the thyristor (14,16) is coupled via a diac (30) to a control signal generating circuit (18) operable to vary the conduction interval of the thyristor (14,16) on each cycle of voltage from the supply (10) by switching the diac (30). A further thyristor (38,42) such as a triac or silicon controlled rectifier is connected to be responsive to the switching of the diac (30) to be itself switched so as to provide a current flow path from the control terminal (14c,16c) of the main thyristor to render the main thyristor insensitive to immediate further control under influence of the diac.

9 Claims, 9 Drawing Figures

ELECTRICAL SWITCHING DEVICE

This invention relates to an electrical switching device of the kind comprising a semiconductor thyristor having first and second terminals the state of conduction between which terminals, when a periodically varying first signal is applied thereacross, is controllable to change from a first to a second state at a particular time during a cycle of the first signal, in response to a change, at a third control terminal of the thyristor, from a first to a second state of a control signal, and a control signal generating circuit for generating said control signal, the control signal generating circuit including a first switchable element switchable from a first to a second state of conduction to effect said change.

Devices of the above kind are in common use, the thyristor normally comprising a triac or silicon controlled rectifier. Usually, the control signal generating circuit includes a diac coupled via a suitable network across the first and second terminals of the thyristor and so arranged as to cause the diac to be switched from a state of nonconduction to a state of conduction at a predetermined time during each cycle or half cycle of said first signal whereby to correspondingly switch the thyristor from a state of nonconduction to a state of conduction at such time. By choosing the network, the particular time at which conduction of the thyristor is initiated during each cycle or half cycle of applied said first signal is selectable so that the effective power delivered to a load connected in series with the switching device is correspondingly selectable. Normally, the said network is arranged to enable variation of the period of thyristor conduction during each cycle of applied first signal to allow selective control of power dissipation in the load.

Particular difficulty arises with devices of the above kind in that it is found that, apparently unexplained surges or pulses occur, more particularly on inductive loads so that, frequently, damage to the thyristor will occur in use even through the nominal rating of the thyristor is well in excess of the expected power dissipation requirements. It has been supposed that the consequent unreliability of thyristors under these circumstances is due to heavy transients induced in the switching device due, for example, to interference in the first signal. Thus, it is customary to include sometimes elaborate means for eliminating such transients with a view to improving reliability of the switching device.

The present invention is based on a premise that unreliability of devices of the kind described is not due simply to transients occurring in the first signal, but rather occurs through faulty operation of the first switchable element.

Accordingly, a switching device as described above is characterized, in accordance with this invention, in that the control signal generating circuit further includes a second switching element connected whereby in use to be responsive to said change in state of conduction of said first switching element to revert said control signal to said first state after said change therein. More particularly, the second switching element may be switched to a state of conduction upon detection of the change of state of the first switching element to effect said reversion. The first switching element may, as is known, comprise a diac coupled to the third terminal of the thyristor via a network forming part of said control signal generating circuit, said network being coupled across said first and second terminals and said diac being responsive to variations in electric signal across part of said network occurring during application of said first signal to the thyristor to switch said diac on pursuant to occurrence across said part of said network of a particular voltage level, this switching on causing said change in said control signal. The said second switching element may be arranged across said part of said network to at least substantially short-circuit said part pursuant to detection of said change in said control signal.

The second switching element may comprise a triac or SCR, having its main current carrying terminals connected across said part of said network and its control terminal connected so as to derive a suitable control voltage from part of the device. It may, for example, be arranged to receive such control voltage as generated between the third and one of the other terminals of said thyristor.

The invention is further described with reference to the accompanying drawings in which:

FIG. 1 is a circuit diagram of a switching device according to the prior art, and FIGS. 2 to 9 illustrate various embodiments of the present invention.

Figure 2:
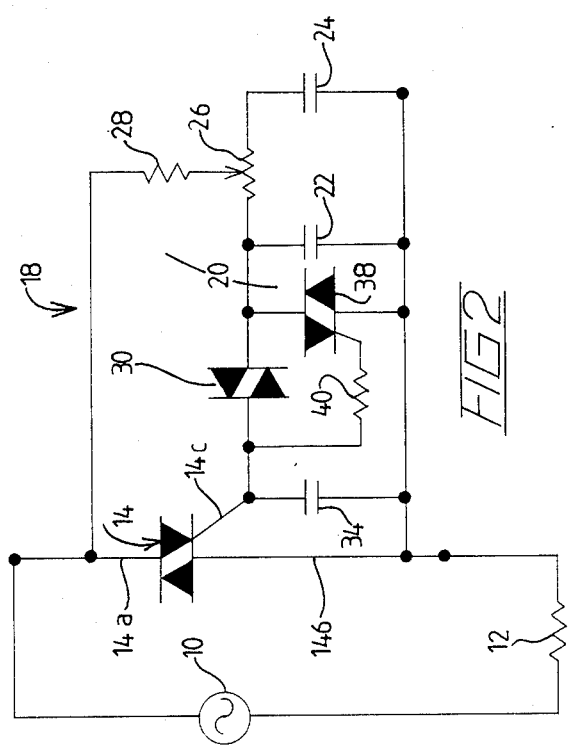
Figure 3:
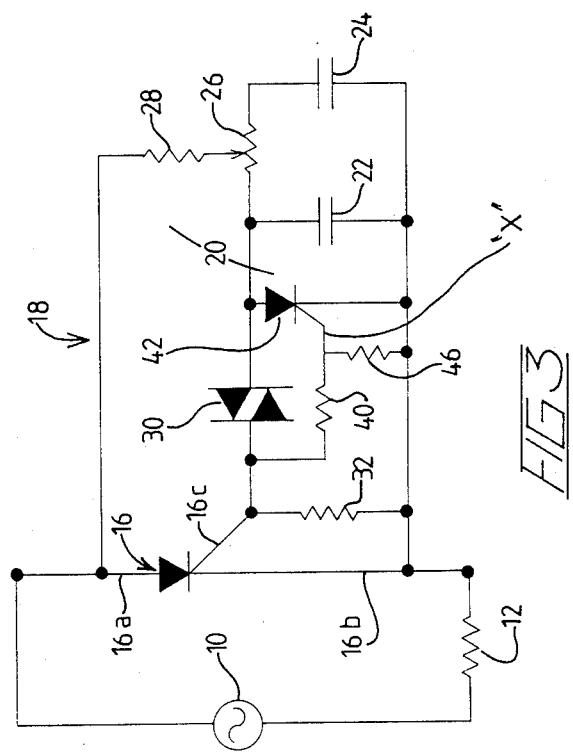
Figure 4:
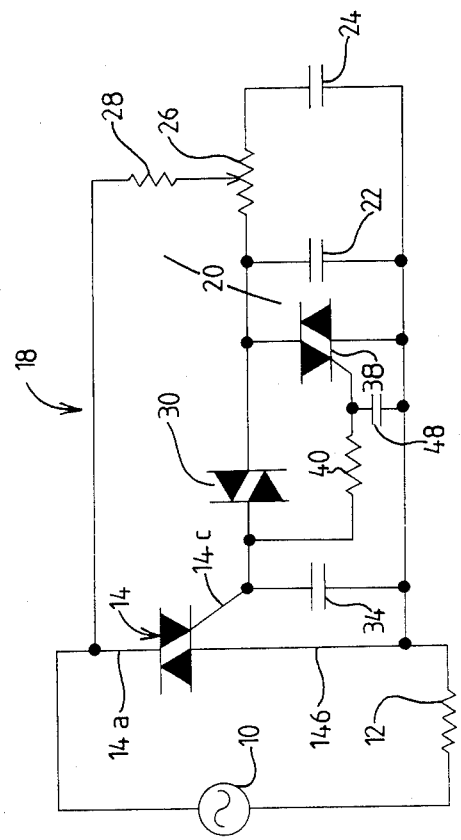
Figure 5:
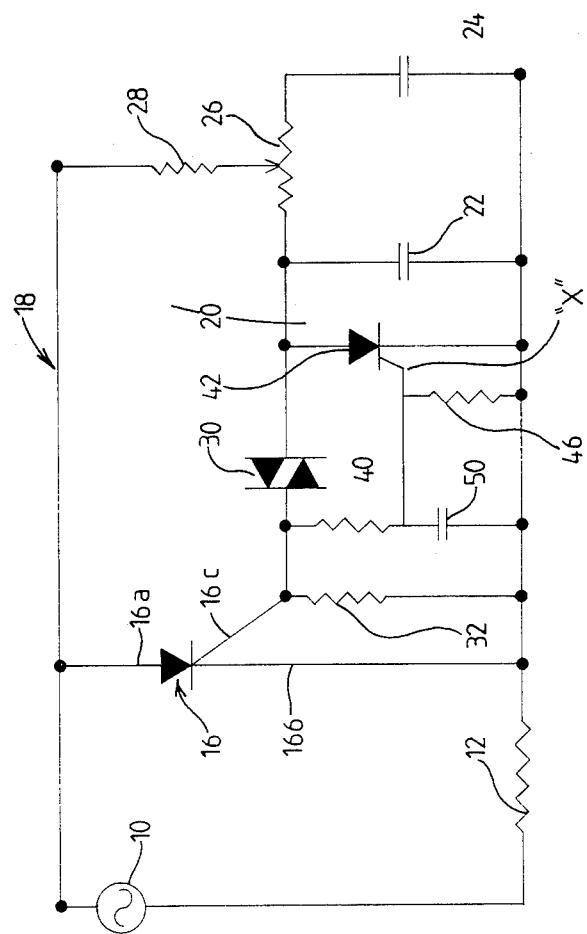
Figure 6:
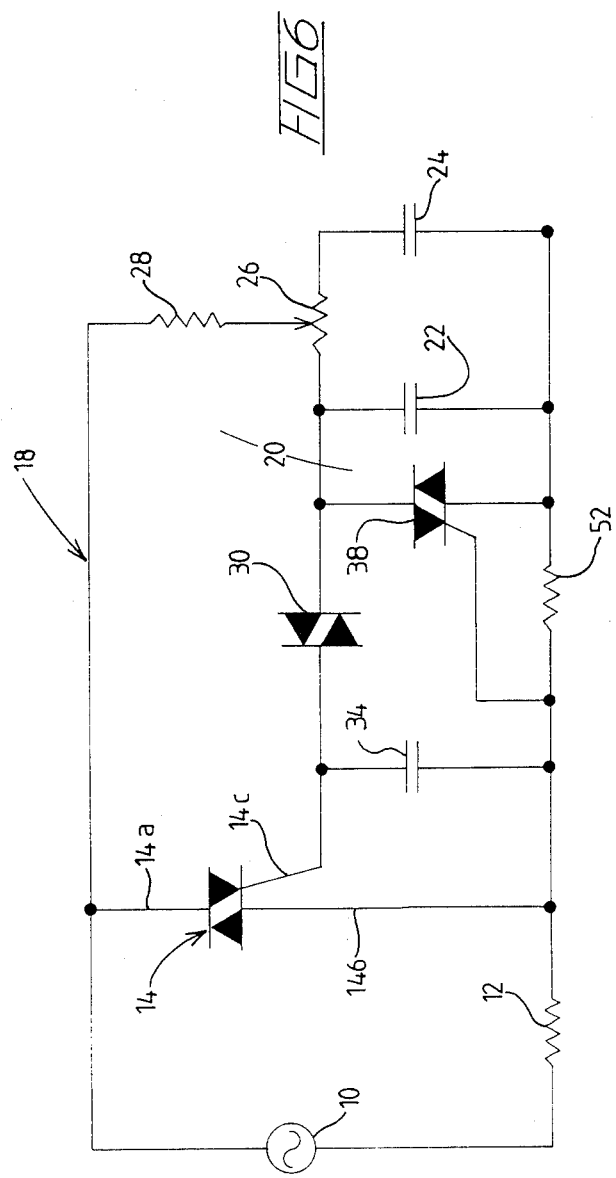
Figure 7:
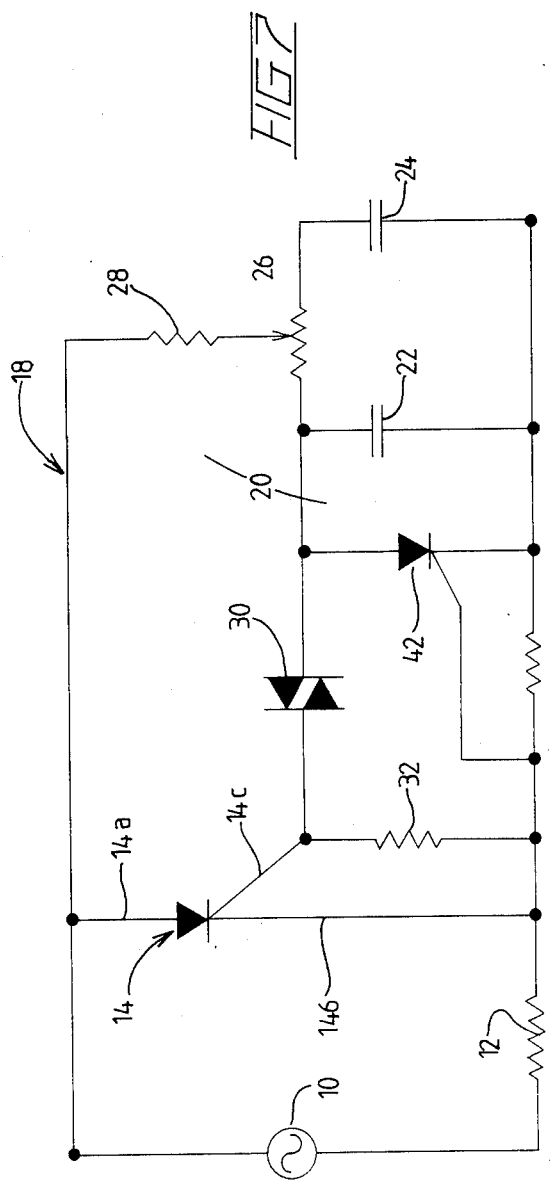

Generally speaking, in each of FIGS. 1 to 9 there is shown an alternating current supply 10 having connected across the terminals thereof a series circuit comprising a load 12 and a thyristor which is either a triac 14 (FIGS. 1, 2, 4, 6, 8 and 9) or and SCR (FIGS. 3, 5 and 7). In either event the thyristor is arranged with its main current carrying terminals 14a, 14b or 16a, 16b connected between one terminal of the load 12 and one terminal of the supply 10.

In each case, there is also provided a control signal generating circuit 18. Although the details of the circuit 18 vary in each of the devices shown in FIGS. 1 to 7, each has in common the following:

(a) a network 20 connected across the main current carrying terminals of the thyristor 14 or 16 and made up of two capacitors 22, 24 and a resistor 26 connected in a delta network, the commonly connected terminals of the capacitors 22, 24 being connected to one of the main current carrying terminals 14b or 16b of the thyristor. In each case, the resistor 26 comprises a potentiometer, the variable contact of which is connected to the other main current carrying terminal 14a or 16a of the thyristor via a second resistor 28 forming part of network 20, and (b) a diac 30 coupled from the common junction between capacitor 22 and resistor 26 and the control terminal 14c or 16c of the thyristor. The coupling may be direct as in the case of the devices of FIGS. 1 to 8, or indirect as in the case of FIG. 9 where the coupling from the common junction between capacitor 22 and resistor 26 is via a further resistor 33.

In addition to the above, in the devices of FIGS. 1 to 9, where the thyristor is an SCR there is a resistor 32 connected between the control terminal 16c and the second main current carrying terminal 16b. This resistor is provided in accordance with normal practice for suppression of certain undesired transients in circuit 18. Likewise, except in the case of the device of FIG. 8, there is provided in each device using a thyristor in the form of a triac, a capacitor 34 coupled between the control terminal 14c and the main current carrying terminal 14b. Except in FIG. 4, capacitor 34 is provided in accordance with usual practice for purposes of suppression of undesired transients and although shown in each of FIGS. 1, 2, 4, 6 and 9 is not invariably essential in practicing the present invention.

The general operation of each of the devices of FIGS. 1 to 9 is analogous to a certain extent and the following description of the circuit of FIG. 1 is to be taken as indicating the general mode of operation of each of the circuits. More particularly, on each cycle or half cycle of applied voltage from supply 10 which appears across terminal 14a and 14b of triac 14, such supply voltage is also applied directly across the network 20. The network is a form of voltage divider so that portion of the signal applied across the network appears across the capacitor 22. This signal will, however, vary in maximum amplitude and comparative phase relationship as compared with the phase of signal applied directly across the terminal 14a, 14b to an extent which is determined by the values of the capacitors 22 and 24, by the values of the resistors 26 and 28 and in accordance with the particular setting of the potentiometer comprising resistor 26. At a particular time during each cycle the voltage across the capacitor 22 reaches a value such that conduction of the diac occurs. The diac is so selected that conduction causes a sufficient voltage to be applied across terminals 14c and 14b as to turn the triac 14 on. In accordance with usual operation of triacs, even though the voltage across the capacitor 22 may subsequently decay, such as by leakage through the diac and from control terminal 14c either through the capacitor 34 or through triac 14 itself to terminal 14b, conduction will be maintained until the end of the half cycle on which turn-on occurred. The state of conduction will persist until the end of the half cycle on which it was initiated, whereupon conduction will stop. However, on the next half cycle, the control signal generating circuit 18 will undergo an analogous operation to that previously described to again initiate conduction through the triac 14 at the same time in the half cycle as occurred on the preceding half cycle. Since the network 20 is operable to vary the time at which triac conduction occurs on each half cycle, the effective current flow through the triac and thence through the load 12 is variable in accordance with the setting of the potentiometer comprising resistor 26.

The operation of those of the devices shown in FIGS. 1 to 9 which use SCRs instead of triacs is identical to that described in relation to FIG. 1 save that conduction through the SCR occurs only on those half cycles of the applied supply there across where the terminal 16a (the anode) is positive with respect to the terminal 16b (the cathode), no conduction occurring on the alternate half cycles.

Turning now to FIG. 2 it will be noted that in addition to the components shown in FIG. 1 the control signal generating circuit 18 is modified by inclusion of further triac 38. The triac 38 is connected with its main current carrying terminals connected across capacitor 22 and with its control terminal connected via a resistor 40 to control terminal 14c of triac 14. It will be observed, in this respect, that the voltage between the control electrode of triac 38 and that one of its main current carrying terminals which is connected to the terminal 14b of triac 14 is, prior to conduction of the diac 30 equal to the voltage across the terminals 14b, 14c of triac 14. Thus, up until the condition of conduction of diac 30 the voltage so applied to the control terminal of triac 38 is substantially zero. However, upon conduction of diac 30, the voltage so applied to the control terminal of triac 38 will rise in accordance with the rise of voltage applied to the control terminal 14c of triac 14. The triac 38 and resistor 40 are so selected that this rise is detected and caused to operate the triac 38 to render it conductive. In practice, a triac 38 will turn on almost immediately after the voltage rise on terminal 14c occurs but sufficiently long thereafter as to not interfere with the turning on of the triac 14. As soon as triac 38 turns on, capacitor 22 is short circuited by triac 38 and the voltage applied from capacitor 22 to diac 30 is reduced substantially to zero so turning the diac off. It has been found that, by this expedient, a certain turning on action of the diac 30 and thus of triac 14 occurs. In this regard, I have ascertained that when using, for example, the circuit of FIG. 1, although an initial turn-on of the triac 14 may occur with some certainty as the diac 30 itself is turned on, very substantial voltage fluctuations may subsequently occur in the circuit 18 giving rise to substantial voltage variations at the junction between capacitor 22 and resistor 26 so that the time of firing of diac 30 may vary in an uncontrolled fashion giving rise to a period of uncertain behaviour of the signal at the control terminal 14c immediately after turn-on of the diac. For example the diac 30 may turn on and immediately turn off and on again once or several times and the resultant transients can cause substantial voltages to be generated at the terminal 14c by virtue of the capacitive nature of the circuit 18. It is these fluctuations which I have ascertained are responsible in many instances for damage to thyristors particularly in iron-cored inductive loading of the thyristor where large surge currents can result from erratic switching. In the case of FIG. 2, the triac 14 is protected from such damage by the short-circuiting action of the triac 38. It should be noted, in this regard, that triac 14 would normally be of a heavy current carrying type which is particularly suspect to damage by the mechanism described whereas the triac 38, carrying only a small current and operating on a fixed load, can easily be selected from types operating well within their rating and thus substantially immune from damage of the kind described. Suitable snubbing circuits can also be added for more complete protection, because of the fixed load on triac 38.

Aside from the differences previously noted the circuits 18 of each of the devices of FIGS. 1 to 9, the following differences will be noted between the devices of FIGS. 3 to 9 as compared with the device of FIG. 2.

FIG. 3

Here the triac 38 is replaced by an SCR 42 again connected directly across capacitor 22 and having its control terminal coupled by a resistor 40 to the control terminal 16c of SCR 16. The control terminal of the SCR 42 is also coupled to terminal 16b by a resistor 46. The operation of the arrangement of FIG. 3 is identical to that shown in FIG. 2 save that short-circuiting of the capacitor 22 by operation of the SCR 42 occurs only on those half cycles for which SCR 16 can, in any event, be rendered conductive.

FIG. 4

This is analogous to FIG. 2 save that a capacitor 48 is connected between terminal 14b of triac 14 and the control terminal of triac 38. This capacitor is provided to permit additional delay in build up of voltage on the control terminal of triac 38.

FIG. 5

This is analogous to the device of FIG. 3 save that an additional capacitor 50 is connected in parallel with the resistor 46 coupled to the control terminal of SCR 42. This capacitor is arranged to permit an additional delay in build-up of voltage on the control terminal of SCR 42 so that switch-on of the SCR 42 can be arranged to occur at a rather later time than would be the case if switch-on were to occur only directly as a result of conduction of diac 30. In some instances, too speedy turn-on of the SCR 42 may give insufficient time for proper turn-on of SCR 16, and in this case the additional capacitor 50 may be utilized to allow a sufficient period of conduction of diac 30 to ensure that reliable turn-on of the SCR 16 occurs.

FIG. 6

This is analogous to the device of FIG. 2 save that resistor 40 is eliminated in favour of a resistor 52 connected between terminal 14b of triac 14 and the common junction of capacitors 22 and 24. In this case, there will be a voltage developed across resistor 52 substantially only in the case where conduction of diac 30 occurs, by virtue of current flow from the common junction of capacitor 22 and resistor 26, through the diac, through capacitor 34 (or from terminal terminal 14c through to terminal 14b), thence through the resistor 52 to the common junction of capacitors 22 and 24. The control terminal of triac 38 is in this case connected to the junction between terminal 14b of triac 14 and resistor 52. Since there is only a voltage developed across resistor 52 pursuant to conduction of diac 30, turn-on of triac 38 can occur in the same fashion as described previously, when diac 30 conducts.

FIG. 7

This is analagous to FIG. 6, including the resistor 52 positioned as described. In this case, however, triac 38 is replaced by the SCR 42, in view of the use, in this circuit, of SCR 16.

FIG. 8

This device is analagous to that shown in FIG. 2 save that capacitor 34 is eliminated, and the triac 38 is arranged to be comparatively reversely connected across capacitor 22 as compared to FIG. 1. Here, the control terminal of the triac 38 is connected directly to the control terminal 14c of triac 14, via a resistor 54. The voltage applied to the control terminal of the triac 38 is thus dependent upon the voltage across the diac 30, which is connected in series circuit with the resistor 54 between the control terminal of the triac 38 and one of the main current carrying terminals of the triac 38. On conduction of diac 30, there is a small voltage drop thereacross of polarity corresponding to that required to turn on the triac 38, so that again, turn on of the triac 38 occurs pursuant to conduction of diac 30. In this case, an additional capacitor 56 may, if desired, be connected between the control terminal of triac 38 and the junction between capacitors 22 and 24 in the manner previously described for further delay of switching of triac 38.

FIG. 9

Figure 8:
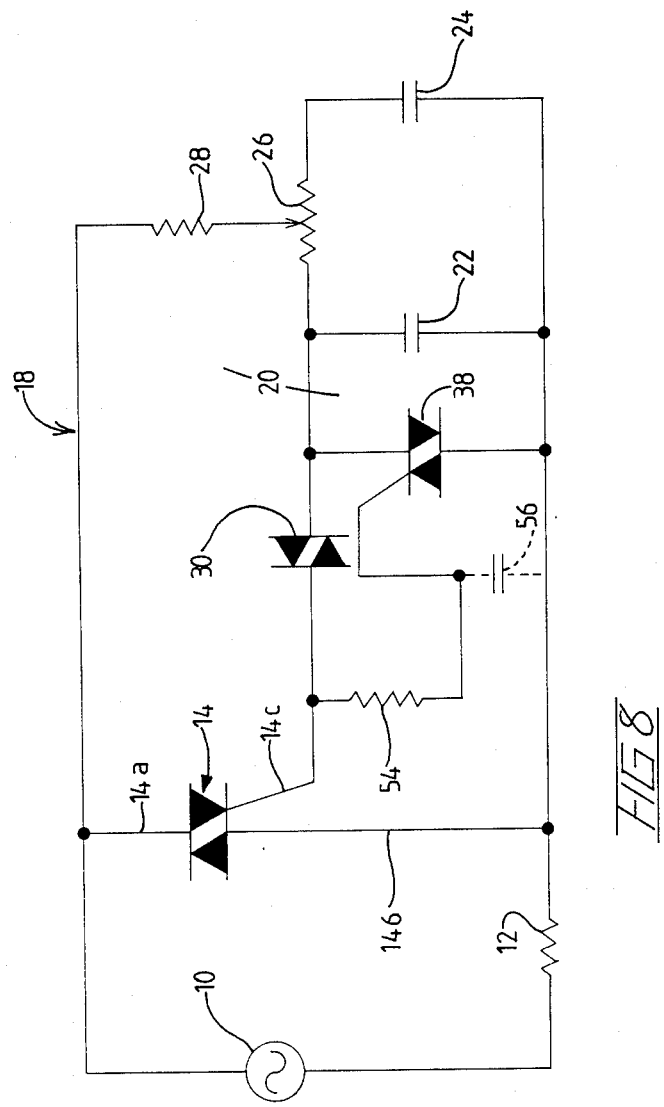
Figure 9:
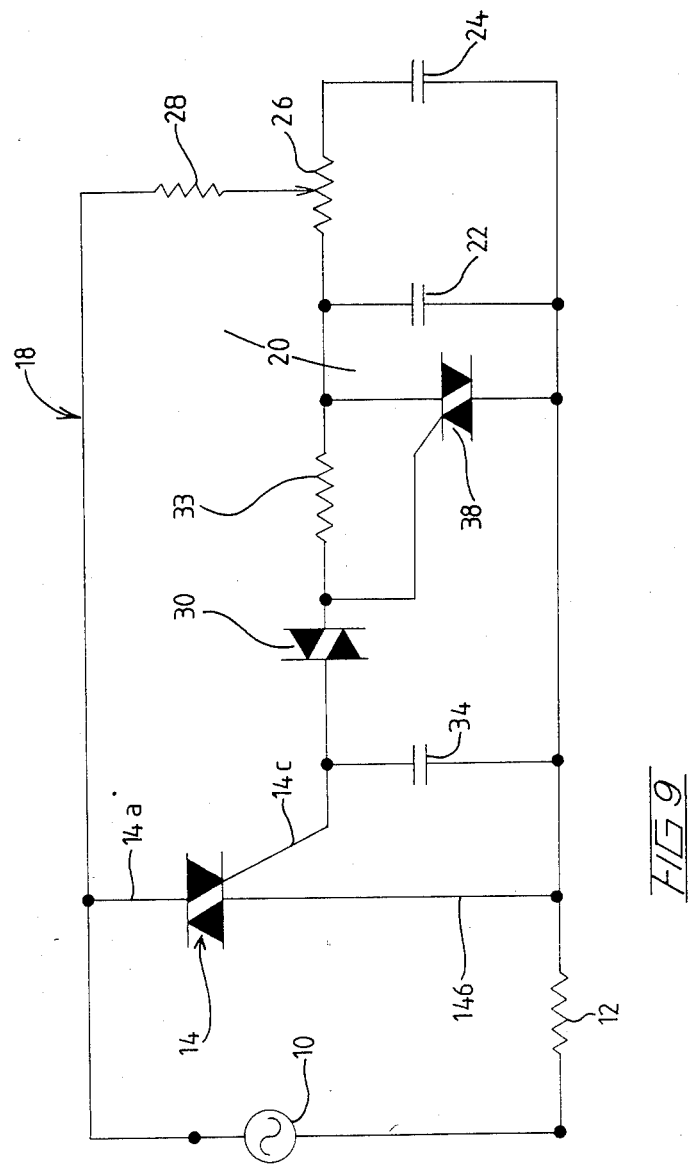

The device shown therein is analogous to that shown in FIG. 8 save that the resistor 54 is not provided and, instead, the previously described resistor 33 is provided connected between the junction of capacitor 22 and resistor 26 and the diac 30. When conduction of diac 30 occurs, there is a voltage drop across resistor 33 and the control electrode of the triac 38 is connected so as to be sensitive to this voltage drop to turn on the triac 38.

The described arrangements have been advanced merely by way of explanation. It will be understood that the precise nature of the circuit 18 may vary considerably, in accordance with usual practice, whilst still permitting use of the principle of the present invention. More particularly, although each of the described circuits 18 utilize network 20, other timing networks of suitable known form may be employed. Indeed, the invention may be applied to cases where the timing control signals generated by circuit 18 are derived otherwise than from the supply voltage from supply 10 itself. Again, many detailed variations may be made to the specific arrangement shown. In each case where the main control thyristor is a SCR as described, the switching element which is used to short-circuit the capacitor 22 is an SCR, although obviously, in this case a triac could be used to effect short-circuiting. Likewise, in the arrangement of FIG. 2, the resistor 40 even may be omitted by suitable selection of the triacs 38, 14 and diac 30; analogous economies may be made in others of the circuits. Furthermore, although a variety of means of deriving the necessary firing voltage for effecting initiation of conduction of the triac 38 or SCR 42 have been described, it will be appreciated that many alternative means of deriving the signal can be employed. All that is necessary is to derive voltage which is somehow responsive to the change of conduction of the diac 30.

What is claimed is:

1. An electrical switching device comprising
a thyristor; and
a control signal generating circuit for generating a control signal to change the conduction state of the thyristor, said control circuit including
a first switchable element for applying said control signal to said thyristor; and
a second switching element responsive to the application of the control signal to the thyristor by the first switchable element for substantially removing the control signal from the thyristor after its conduction state has been changed by the control signal.

2. An electrical switching device as in claim 1 where said second switching element is rendered electrically conductive in response to said application of the control signal to the thyristor by the first switchable element.

3. An electrical switching device as in claim 2 where said thyristor includes a control terminal and first and second signal conduction terminals; said first switchable element includes a diac coupled to said control terminal; and said control signal generating circuit being coupled across said first and second terminals and including first circuit means responsive to a signal occurring across the thyristor to render said diac conductive and thus apply said control signal to the thyristor.

4. An electrical switching device as in claim 3 where said second switching element substantially short circuits said first circuit means in response to said application of the control signal to the thyristor by the first switchable element.

5. An electrical switching device as in claim 4 where said control signal generating means includes second circuit means and said second switching element includes a triac having its main current carrying terminals connected across said first circuit means and its control terminal connected to said second circuit means.

6. An electrical switching device as in claim 4 where said control signal generating means includes second circuit means and said second switching element includes a silicon controlled rectifier having its main current carrying terminals connected across said first circuit means and its control terminal connected to said second circuit means.

7. An electrical switching device as in claims 5 or 6 where the contrl signal for said second switching element is generated between the control terminal and one of said first and second terminals of the thyristor.

8. An electrical switching device as in claims 1, 3 or 4 where the current carried by said thyristor is substantially greater than that carried by said second switching element.

9. An electrical switching device as in claim 8 including a load in circuit with said thyristor including an iron-cored inductor.

* * * * *